Nov. 27, 1923.
V. R. BOTTONE
CONNECTER
Filed March 30, 1921
1,475,257
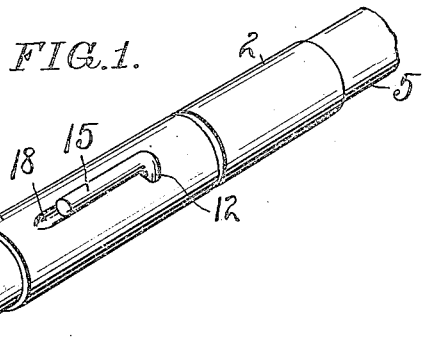
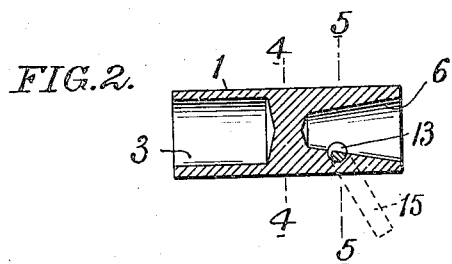
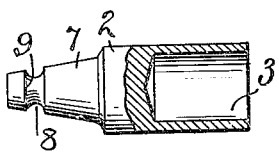
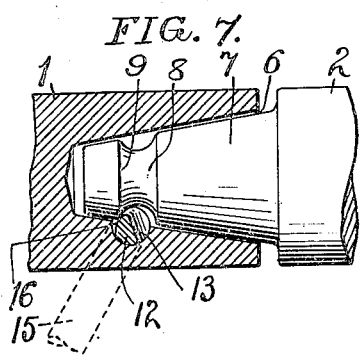
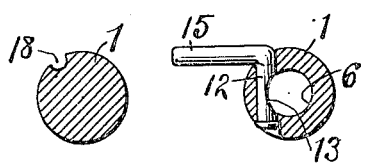
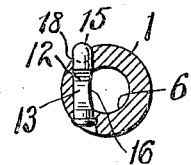
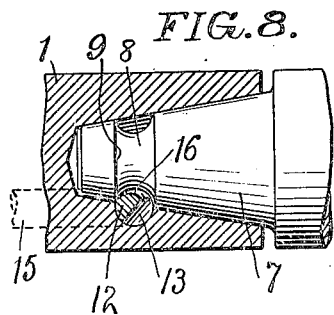
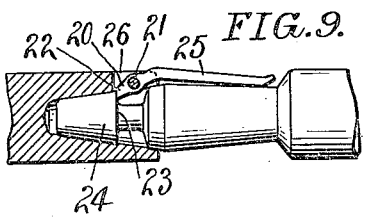
Inventor
Victor R. Bottone
By F. DeWitt Goodwin
Attorney Patented Nov. 27, 1923.

1,475,257

UNITED STATES PATENT OFFICE.

VICTOR R. BOTTONE, OF PHILADELPHIA, PENNSYLVANIA, ASSIGNOR OF ONE-HALF TO JOHN S. McALEER, OF PHILADELPHIA, PENNSYLVANIA.

CONNECTER.

Application filed March 30, 1921. Serial No. 456,845.

*To all whom it may concern:*

Be it known that I, VICTOR R. BOTTONE, a subject of Great Britain, residing at Philadelphia, in the county of Philadelphia and State of Pennsylvania, have invented certain new and useful Improvements in a Connecter, of which the following is a specification.

My invention relates to improvements in a connecter adapted for detachably connecting two members together, such as the ends of a necklace or similar articles of jewelry and also adapted for connecting electrical cables and conductors.

The object of my invention is to construct a connecter having counter parts adapted to fit together and provided with a locking member, forming a positive lock, which will prevent the parts from being pulled apart by a strain upon the chain or cable joined by the connecter; a still further object of my invention is to provide a handle for turning the locking member into and out of the engaging position and a still further object of my invention is to provide the locking member with a cam surface by which the parts will be drawn tightly together by a cam action when the handle of the locking member is turned into the locking position.

Referring to the accompanying drawing; Fig. 1, is a perspective view of my improved connecter; Figs. 2 and 3 are longitudinal sectional views of the two parts, or sleeves, forming the connecter, detached; Fig. 4, is a transverse section of the sleeve showing the longitudinal recess formed therein for retaining the handle, as on line 4—4 Fig. 2; Fig. 5, is a transverse section on line 5—5 Fig. 2; Fig. 6 is a view similar to Fig. 5, showing the handle in the locked position; Fig. 7, is an enlarged longitudinal section of the connecter showing the cam action of the locking member; Fig. 8, is a view similar to Fig. 7, showing the parts in the locked position, and Fig. 9, is a view showing a modified form of the locking member for joining the parts of the connecter together.

In the accompanying drawings in which like reference characters refer to like parts, 1 and 2 represent the separable parts or sleeves forming the connecter. Said parts 1 and 2 have recesses 3 formed in opposite ends for the reception of the ends 4 and 5 of a chain, cable or conductor adapted to be permanently secured in the parts or sleeves 1 and 2.

The part, or sleeve, 1 is provided with a conical recess 6 in to which fits the conical shank 7 formed upon the opposite part 2. The conical shank 7 is provided with an annular groove 8 forming an annular shoulder 9 which is engaged by the locking member 12, mounted upon part 1 of the connecter.

The locking member 12 consists of a transverse rod, or shaft, rotatably mounted in the part 1. Said shaft or member 12 is provided with a recess 13 formed in the side thereof and extending adjacent to the center of the shaft and curved to conform with the inner surface of the recess 6 formed in the part 1. The shaft or locking member 12 is provided with a handle 15 for turning the locking member 12. When the locking member 12 is turned into the position shown in Figs. 2 and 5, the shank 7 may be inserted or removed from the recess 6 of part 1 and said shank will not be obstructed or engaged by the locking member.

The locking member 12 is provided with a cam surface 16, as shown in Figs. 7 and 8. Said cam surface 16 is formed so that in the movement of the locking member 12, from the open position, shown in Fig. 5, to the initial engaging position shown in Fig. 7, the shoulder 9, on the shank 7, will first be engaged by the short radius, or low place, in the cam surface 16 and the locking member 12 may thus rotate even though the shank 7 is not tightly inserted into the recess 6 of part 1, and the cam surface 16 will thus gradually press against the shoulder 9 and force the shank 7 tightly into the recess 6.

When the handle 15 is in the position shown in Fig. 8 the greatest diameter of the cam 16 will be in engagement with the shoulder 9 and it will form a positive lock to hold the shank 7 in the part 1.

When the handle 15 is in the locked position as shown in Figs. 1, 6, and 8, the handle will spring into the longitudinal groove 18, formed in the cylindrical surface of the part 1 and the handle 15 will be thus locked in the engaging position with the locking member positively holding together the two parts of the connecter.

A slightly different form of my invention is shown in Fig. 9, in which the locking member 20 is rotatable upon a transverse axis 21 in the receiving part. The locking member 20 has a cam surface 22 adapted to engage the shoulder 23 of the shank 24 and thus force the shank into the receiving member. The locking member 20 is provided with a handle 25 which operates in a longitudinal slot 26 formed in the receiving part. When in the locked position the handle 25 rests upon the surface of the part on which the shank 24 is formed and the point of contact between the cam surface 22 and the shoulder 23 is positioned nearly in alignment with the center of rotation of the locking member, so that a positive lock is formed and the parts cannot be separated without first moving the handle to release the shank.

Having thus described my invention, I claim and desire to secure by Letters Patent:

1. An electrical connecter comprising a part having a shank, a receiving part having a recess formed therein adapted to receive said shank in axial alignment, an annular shoulder formed upon said shank, a locking member rotatably mounted in said receiving part upon an axis extending at right angles to the longitudinal axis of the receiving part, and a cam surface upon the locking member adapted to engage said shoulder and force the shank longitudinally into the receiving part by a rotary movement of the locking member.

2. An electrical connecter comprising a part having a conical shank, a receiving part having a conical recess formed therein adapted to receive said shank, an annular shoulder formed upon said shank, a shaft rotatably mounted in said receiving part, and a cam surface upon the shaft adapted to engage said shoulder and force the shank longitudinally into the receiving part by a rotary movement of the shaft.

In testimony whereof I affix my signature.

VICTOR R. BOTTONE.